United States Patent [19]
Hug

[11] 3,754,677
[45] Aug. 28, 1973

[54] LIQUID CONTAINER DRAIN DEVICE
[75] Inventor: Karl Hug, Lenzhanner, Germany
[73] Assignee: General Motors Corporation, Detroit, Mich.
[22] Filed: Mar. 15, 1971
[21] Appl. No.: 124,371

[30] Foreign Application Priority Data
Apr. 4, 1970 Germany.................. G 70 12 405.9

[52] U.S. Cl.............. 220/39 R, 85/32 K, 151/41.7, 184/1.5
[51] Int. Cl............................................. B65d 41/04
[58] Field of Search.................... 220/39 R; 184/1.5; 85/32 K; 151/38, 41.7

[56] References Cited
UNITED STATES PATENTS
2,326,285 8/1943 Burke........................... 85/32 K UX
3,097,663 7/1963 Buchwald....................... 184/1.5 X Primary Examiner—Herbert F. Ross
Assistant Examiner—James R. Garrett
Attorney—J. L. Carpenter and R. J. Outland

[57] ABSTRACT

A liquid container drain device, such as a drain device for the sump of an automotive engine. A threaded nut, into which a threaded closure plug is insertable, is carried by a blade spring secured to the container wall at at least one end. When the plug is inserted, the blade spring is loaded, and the nut drawn against the container wall opposite a drain aperture; when the plug is removed the blade spring is unloaded and acts to lift the nut away from the container wall, thus permitting the dregs of the container contents to drain away. In modifications, a portion of the container wall may be resilient instead of, or in addition to, a support for the nut.

7 Claims, 13 Drawing Figures

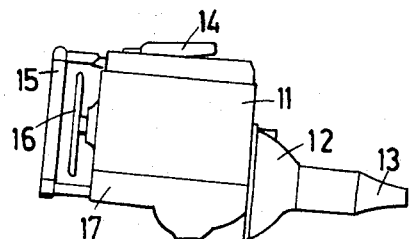
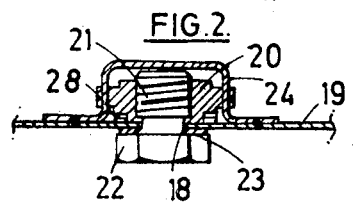
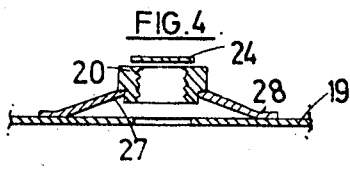
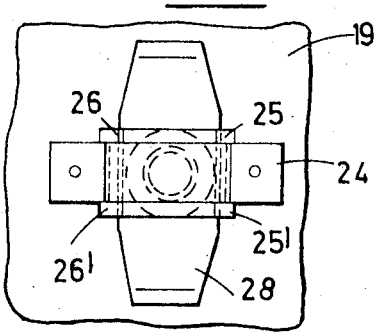
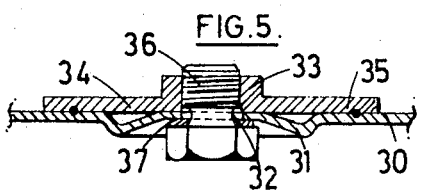
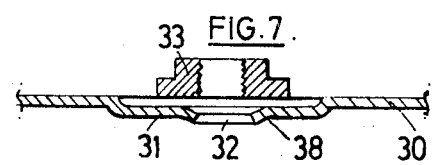
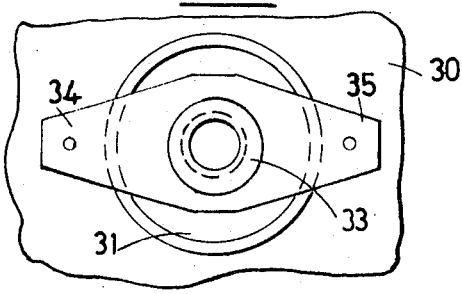
Inventor
Karl Hug
BY
Robert J. Outland
Attorney

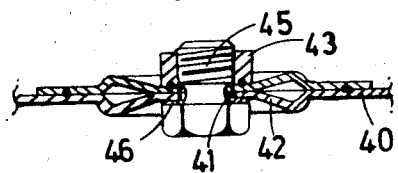
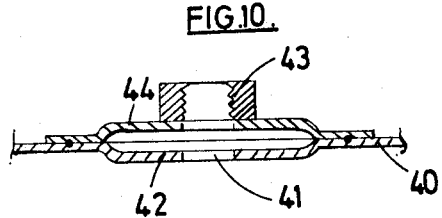
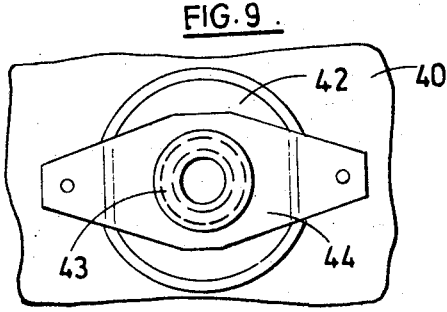
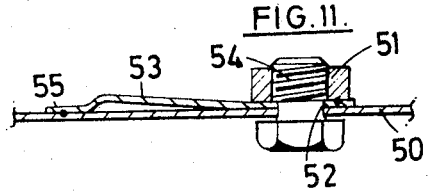
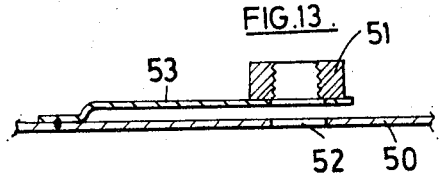
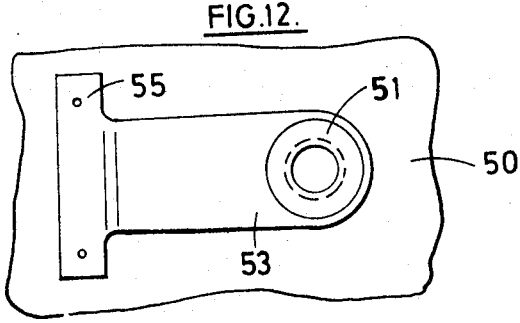
Inventor
Karl Hug

LIQUID CONTAINER DRAIN DEVICE

This invention relates to liquid container drain devices arranged at the lowest point of the container, for example, automotive engine sump drain devices.

Usually these drain devices include a screw plug, a threaded nut and a sealing element which is pressed in between the bottom of the container and the screw plug and/or the threaded nut.

With the known constructions of such drain devices, the threaded lock nuts are fixedly welded to the inside of the container. The result is that the liquid discharged, after unscrewing the plug, can only flow away through the threaded bore of the lock nut. The container therefore cannot be drained completely. Dregs reaching the height of the lock nut always remain behind. In the case of sumps of motor vehicle engines, that is found to be particularly detrimental because it is precisely the most polluted and spent oil dregs that cannot be drained off. This leads to considerable pollution of the fresh engine oil introduced.

In order to attain complete evacuation of liquid containers, particularly the sumps of motor vehicle engines, according to one embodiment of the invention it is proposed to provide resilient means between the container bottom and the nut, whereby during release of the screw plug, the nut is lifted up from the container bottom.

The resilient means may take the form of a flat spring.

According to a modification, parts of the container bottom may act as the resilient means, and operate to open an aperture between the nut and the container wall during release of the screw plug.

Several embodiments of the invention are described in detail below with reference to the accompanying drawing in which;

FIG. 1 shows the outline of a conventional motor vehicle engine with an oil sump;

FIG. 2 a first embodiment of the novelty in section;

FIG. 3 the same embodiment in plan, seen from the inside of the oil container;

FIG. 4 a section at right angles to FIG. 2, with the threaded drain plug removed;

FIGS. 5, 6 and 7 show a second embodiment in a presentation corresponding to that of FIGS. 2, 3 and 4;

FIGS. 8, 9 and 10 show a third embodiment in a presentation corresponding to that of FIGS. 2, 3 and 4; and FIGS. 11, 12 and 13 show a fourth embodiment also in a presentation corresponding to FIGS. 2 and 3, except that in FIG. 13 the sectional plane of FIG. 11 has been retained.

The power unit of a motor vehicle shown schematically in FIG. 1, comprises an engine 11, a clutch 12 and a gear transmission 13. 14 indicates the induction silencer, 15 the radiator and 16 the fan. The oil sump container 17 closes off the cylinder block in downward direction. At its lowest point, the oil container is provided with an aperture which is closed by a screw plug 21. To change the oil the aperture is opened and the spent oil is able to flow out.

In the first embodiment of the closure device according to the present invention (FIGS. 2, 3 and 4), a nut 20 into which a screw plug 21 is inserted from outside, is arranged at the discharge aperture on the inside of the oil container bottom 19. Between the head 22 of this screw plug and the oil-bath bottom 19, there is a copper ring 23 which ensures a fluid-tight seal when the plug 21 is tightened up. The nut 20 is guided rotationally fast but axially displaceable in a yoke 24 secured to the bottom 19. For this purpose, at the side of the arms of yoke 24, the nut 20 is provided with pairs of lugs 25, 25' and 26, 26' respectively, which lie at both sides of the arms of yoke 24. The height of yoke 24 is somewhat greater than the thickness of nut 20, so that a certain axial displacement of the nut is possible. At its underside, the nut 20 is provided with a collar 27 against which there lies a flat blade spring 28 arranged at right angles to yoke 24. The flat spring 28 supports itself against the oil container bottom 19 by means of its two arms, whilst with its raised central portion it exerts on nut 20 a force which tends to lift the nut from the bottom 19.

If the screw plug 21 is removed, the flat spring 28 lifts the nut and presses it against yoke 24, thus opening a gap between nut and container wall. The oil is then able to flow away completely by passing under nut 20 and through the discharge aperture 18.

When plug 21 is screwed in, the nut is drawn against the container bottom 19 whilst overcoming the spring force. In this way it forms the abutment for the head 22 of screw plug 21 so that the ring seal 23 is firmly pressed from below against the container bottom 19.

In the second embodiment of the invention, according to FIGS. 5, 6 and 7, a special spring element is dispensed with. Instead, a flat trough 31 is impressed into the container bottom 30 and a discharge aperture 32 is arranged in the centre of same. The nut 33, inside the container bottom 30, has arms 34, 35 (which are in one piece with it) lying across the trough 31 and welded to the bottom 30. When the screw plug 36 is tightened up, the trough 31 is resiliently drawn against nut 33, with the result that the sealing ring 37 is pressed against the bottom 30 in fluid-tight manner.

On release of the screw plug 36, the trough 31 springs back and oil is able to flow away completely, passing through the gap under the nut and out through the discharge aperture 32. In the unstressed condition of trough 31, the edge 38 of the discharge aperture 32 is appropriately bent downwards so that with the device in its closed state, ample contact of the edges is attained at the nut 33.

With the embodiment according to FIGS. 8, 9 and 10, in the same manner as in the previous example, a flat trough 42 is impressed in the container bottom 40 in the area peripheral to the discharge aperture. At the inside, the nut 43 is welded on to an upwardly bulging narrow sheet-metal portion 44 forming a blade spring which in turn is spot-welded to the bottom 40. When the screw plug 45 is tightened up, the trough-shaped portion 42 of the container bottom 40 and the narrow sheet-metal portion 44 are drawn together under resilient deformation and the gasket ring 46 forms a seal. When the screw plug 45 is released, both parts 42, 44 spring back again, so that oil is able to flow away completely under nut 43 around sheet-metal portion 44, and out through the discharge aperture 41.

In a final embodiment according to FIGS. 11, 12 and 13, the nut 51 provided at the inside of the container bottom 50 is fixed to a resilient tongue 53 having one end 55 fixed to the bottom 50, its free end carrying the nut 51. In order to improve the connection between the resilient tongue 53 and the bottom 50 the end 55 is widened. When the screw plug 54 is removed, the tongue 53 with the nut 51 mounted on it, springs back into the position indicated in FIG. 13 and thus frees the discharge aperture 52 so that the container contents are able to run out completely. In order to facilitate insertion of the screw plug 54, the tongue 53 when in the unstressed condition, runs parallel with the container bottom 50.

I claim:

1. A liquid container drain device comprising a drain aperture in a wall of said container, a threaded nut, a blade spring having at least one end secured to said wall and carrying said nut in spaced relation to the inner surface of said wall so that the bore of said nut is axially aligned with the drain aperture and said nut is engageable with the inner surface of said wall, a threaded plug insertable through said aperture into the bore of said nut and having a head larger than said drain aperture, and a seal element compressible between said head and the outer surface of said wall surrounding said aperture to close said aperture; said blade spring being arranged to be loaded by the insertion and unloaded by the removal of said plug, and in the unloaded condition acting to lift the nut away from said wall.

2. In combination with a liquid container having a wall and a drain aperture in said wall, closure means comprising a threaded plug having a head adapted to sealingly engage the outer surface of said wall around said aperture to close said aperture when said threaded plug extends therethrough, a nut non-rotatably mounted in spaced relation to the inner surface of said wall and having a threaded bore axially aligned with said aperture and adapted to receive said threaded plug, and spring means between said nut and the apertured portion of said wall and urging said nut and apertured portion apart, at least one of said nut and spring means being engageable with the inner surface of said wall surrounding said aperture to provide a solid backing for tightly securing said threaded plug in position to close said aperture, and removal of said plug from said aperture permitting said spring means to open a gap between said nut and spring means and said wall adjoining the inner surface of said wall through which liquid in said container may flow along said surface to reach said aperture and be drained.

3. A liquid container drain device according to claim 2, in which an area of said container wall peripheral to said drain aperture has a trough-like resilient formation, whereby said area is resiliently loaded by the insertion and tightening of said plug in said nut.

4. The combination of claim 2 wherein the mounting of said nut on said wall is accomplished by a yoke secured to said wall and caging said nut so as to permit only limited axial movement thereof into and out of engagement with said wall, said spring means being separate from said yoke and said wall.

5. The combination of claim 2 wherein said spring means also comprises means for mounting said nut on said wall.

6. The combination of claim 2 wherein said spring means comprises a resilient area of said container wall peripheral to the apertured portion thereof.

7. The combination of claim 2 wherein said spring means comprises both a resilient area of said container wall peripheral to the apertured portion thereof and means for mounting said nut on said wall.

* * * * *